June 23, 1959 R. N. CORDREY 2,891,768
SEPARABLE HOUSING FOR DRILLING RIGS AND CLUTCH MECHANISMS
Filed June 17, 1955 4 Sheets-Sheet 1

INVENTOR.
Richard N. Cordrey
BY
ATTORNEYS

June 23, 1959 R. N. CORDREY 2,891,768
SEPARABLE HOUSING FOR DRILLING RIGS AND CLUTCH MECHANISMS
Filed June 17, 1955 4 Sheets-Sheet 2

INVENTOR.
Richard N. Cordrey
BY Owen & Owen
ATTORNEYS

June 23, 1959 R. N. CORDREY 2,891,768
SEPARABLE HOUSING FOR DRILLING RIGS AND CLUTCH MECHANISMS
Filed June 17, 1955 4 Sheets-Sheet 3
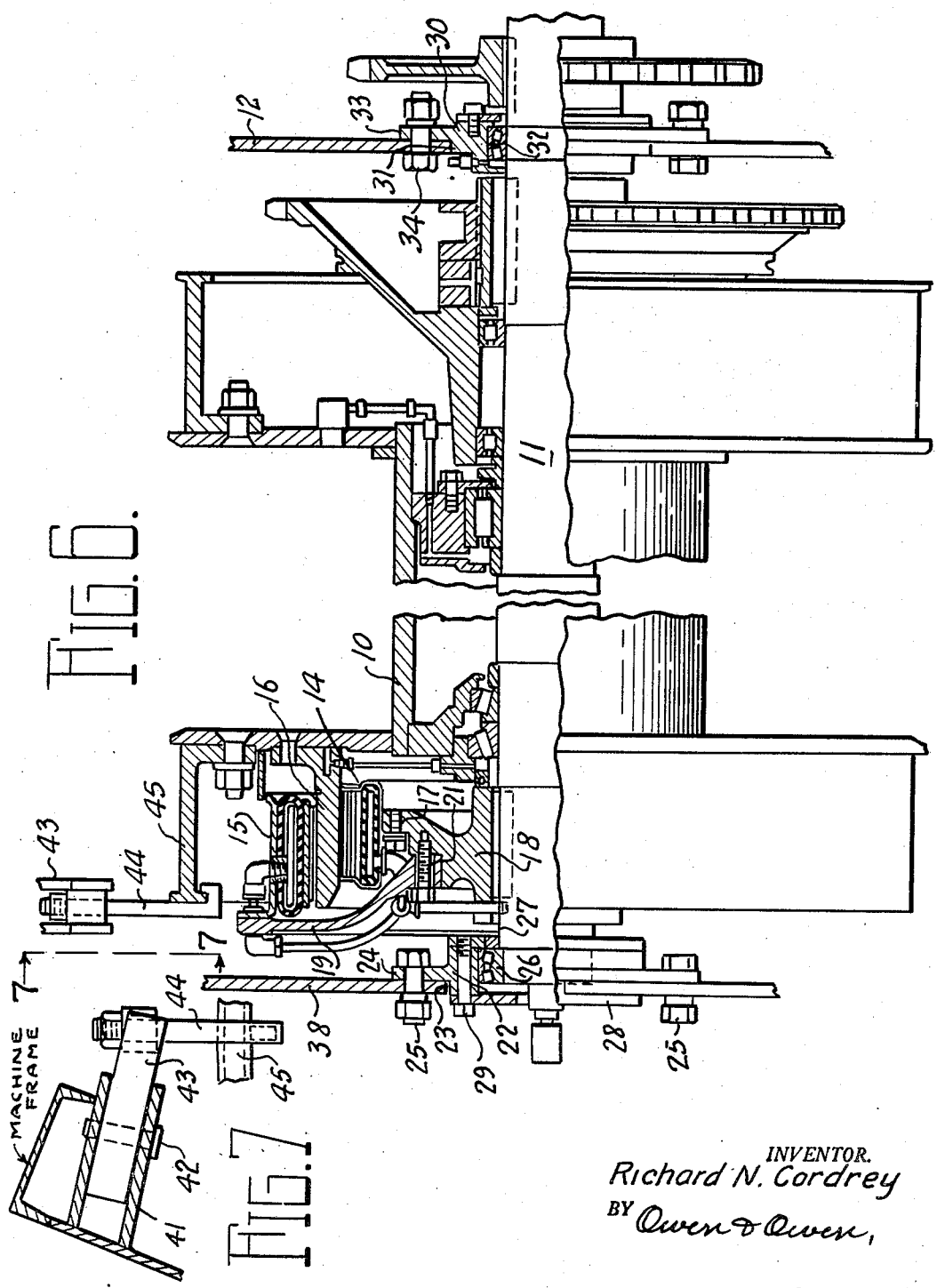
INVENTOR.
Richard N. Cordrey
BY Owen & Owen,
ATTORNEYS

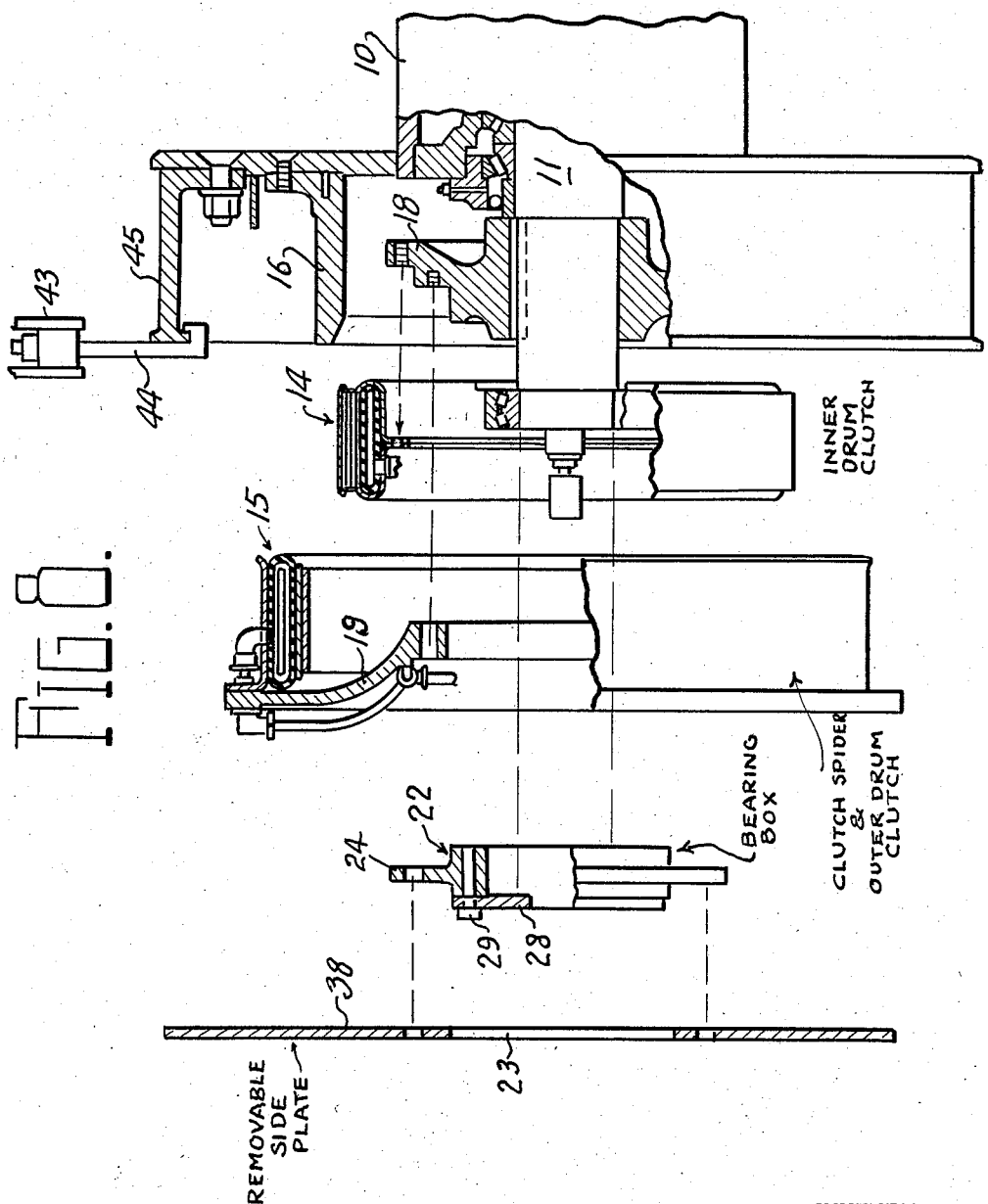

United States Patent Office 2,891,768
Patented June 23, 1959

2,891,768

SEPARABLE HOUSING FOR DRILLING RIGS AND CLUTCH MECHANISMS

Richard N. Cordrey, Toledo, Ohio, assignor, by mesne assignments, to The National Supply Company, Pittsburgh, Pa., a corporation of Ohio Application June 17, 1955, Serial No. 516,064

7 Claims. (Cl. 254—187)

This invention relates to drilling rigs of the type used in connection with the drilling of oil wells or the like, and in which a hoisting cable from the travelling block winds on and is payed out from a drum having controllable clutch and braking means associated therewith, and pertains particularly to a separable housing and support for the drum which is so arranged as to permit easy access to the drum clutch parts for repair.

In apparatus of this class it is customary to provide a housing for the operating parts, including the hoist and pay-out drum for the drilling tool cable and to mount the drum for support by the housing. When necessity for repairing or replacing the clutch drive and/or braking mechanism for the drum arises in the presently used apparatus, the complete removal of the drum is required, together with its mounting shaft and control parts at a considerable expense and loss of time in the use of the apparatus.

The primary object of the invention is the provision of means for housing and supporting said drum and its connected control parts, which permits easy separation of the housing and temporary support of the drum and removal and repair of the control parts without removing the drum and its shaft from their properly positioned mounting in the housing, thus effecting a material saving in time and expense in making repair or replacement of the control parts.

Further objects and advantages of the invention will be apparent from the following detailed description, and from the accompanying drawings illustrating one embodiment thereof, and in which—

Fig. 6 is an enlarged central vertical longitudinal section of the cable drum, its mounting and controls with substantially the lower half in full and with parts broken away;

Figure 1:
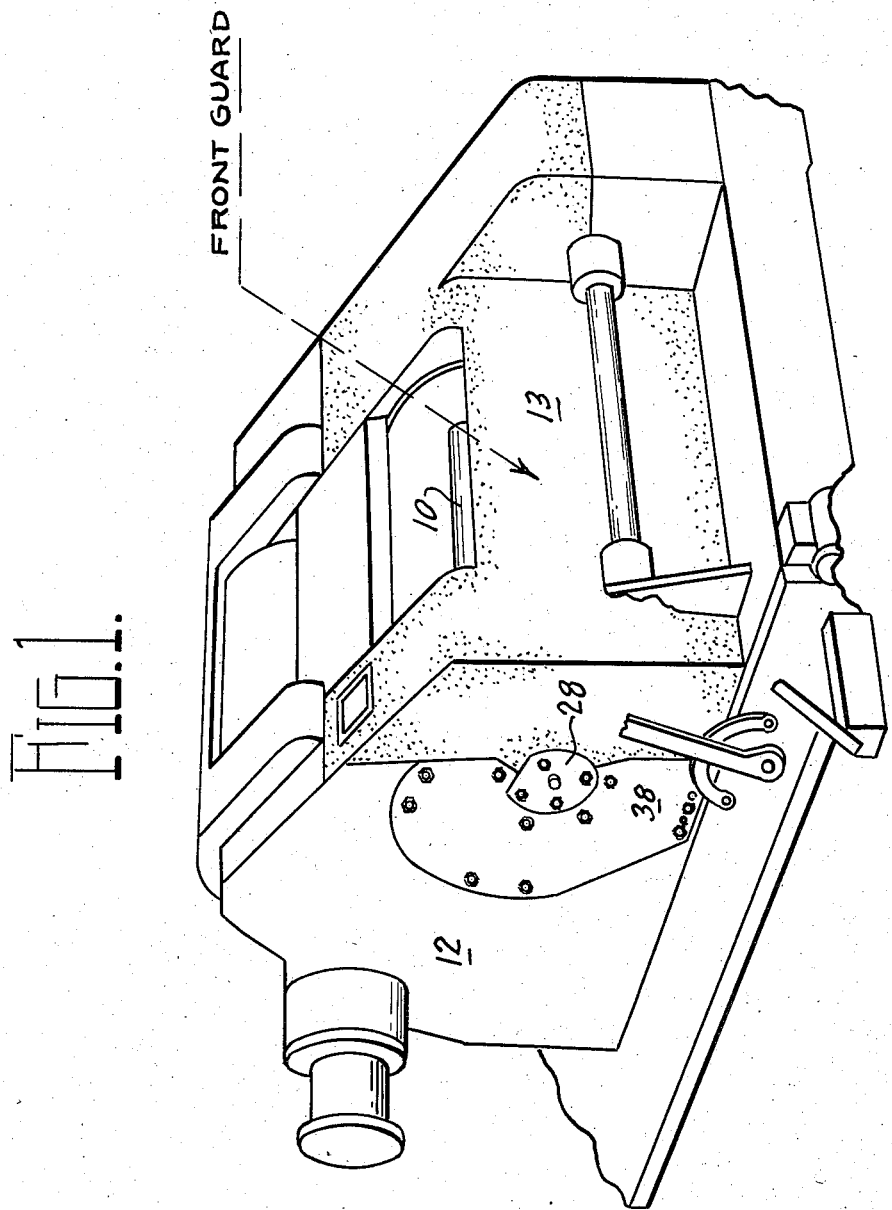
Fig. 1 is a perspective view of a drilling rig embodying the invention.

Fig. 7. is a side view of the auxiliary drum hanger means with its supporting means fragmentarily shown, and Fig. 8 is an enlarged exploded view of the left end portion of the hoist drum and mounting and control parts, with parts broken away.

In drilling rigs of the character to which the present invention pertains, the hoist drum 10 has been mounted for free rotation on a shaft 11 with the ends of the shaft journaled in suitable bearings in the opposed side walls or plates 12 of the rig housing. The housing has an open front end to expose the drum and this is closed by a front guard 13.

Clutch means for driving the drum from the shaft are located at one end of the drum, the left end in the present instance, and customarily comprise inner and outer radially expandable clutch parts 14 and 15, respectively, and an interposed annular flange 16 on the adjacent drum end with which said parts engage. The inner clutch part 14 is secured by screws 17 to a hub 18 keyed to the shaft, and the outer clutch part 15 is carried by a spider 19 that is removably mounted on the hub 18 by screws 21 and is disposed at the outer sides of the clutch parts. The spider 19 is attached to its clutch part by screws 20.

The bearing box or ring 22 is which the left end of the drum shaft is journaled is projected through an opening or notch 23 in the front edge of the adjacent removable portion of the housing side plate (which is hereinafter described), and the rear edge of the corresponding side wall of the front guard 13 meets this edge, as shown in Fig. 1. The bearing box 22 has an annular radial flange 24 that laps the housing side plate in surrounding relation to the opening 23 and is secured thereto by bolts 25. Fitted in the ring 22 and on the shaft 11 is an anti-friction bearing set 26. An annular radial plate 27 is disposed at the inner end of the bearing box 22 and laps the inner side of the bearing set 26. An outer end plate 28 is secured to the outer side of the box 22 by screws 29 that extend through apertures in the plate and ring and thread into the member 27.

The opposite or right hand end of the shaft 11 is mounted in the adjacent side wall 12 of the housing in a manner similar to that of the left end. This mounting is shown as comprising a bearing box or ring 30 setting in an opening 31 in the housing side and enclosing a bearing set 32 on the shaft. The bearing box has a flange 33 lapping the housing side wall and secured thereto by bolts 34. With this manner of mounting the drum shaft, it is supported by the housing sides, and in order to reach the clutch parts for repair, or to remove them for replacement, it has in the past been necessary to remove the front guard 13, then remove and disconnect the various shaft driving and control parts, and then roll the drum with the clutch and drive parts thereon forward on a dolly to permit repair or replacement of the defective parts. This entailed considerable work and expense which it is the purpose of the present invention to materially avoid or reduce to a minimum.

The intent of this invention is to provide a support for the left or clutch carrying end of the drum shaft which support is auxiliary to and in substitution for the bearing box 22 at such end so as to relieve the shaft at that end of any bearing pressure on the housing side wall, and to then remove a section 38 of the housing side wall 12 at such end, which section aligns endwise with and is commensurate in size to the two clutch means 14 and 15. This permits successive outward removal of the bearing box 22, the spider 19 with its outer clutch means 15, and the inner clutch means 14 from the plate hub, as shown by the exploded view in Fig. 8.

The auxiliary support for the shaft and parts carried thereby may take any suitable form, but is most conveniently accomplished by removing the customary spinning line pulley 40 from its forked bracket 41 (Fig. 2) after first removing the pulley holding pin 42, and then securing a temporary support arm 43 in this bracket by use of the same pin. Suspended from the outer end of this arm 43 is a hook-bolt 44 the lower hooked end of which is adapted to engage under the outer edge of the customary rim flange 45 at the adjacent end of the drum 10. The nut at the top of the hook-bolt is now adjusted until the bearing box 22 freely turns in the side plate opening 23, the bolts 25 having first been removed. It will be apparent that any suitable support or suspension device could be used in place of the hook-bolt 44, but the device shown is preferred for its accessibility and convenience.

Figure 2:
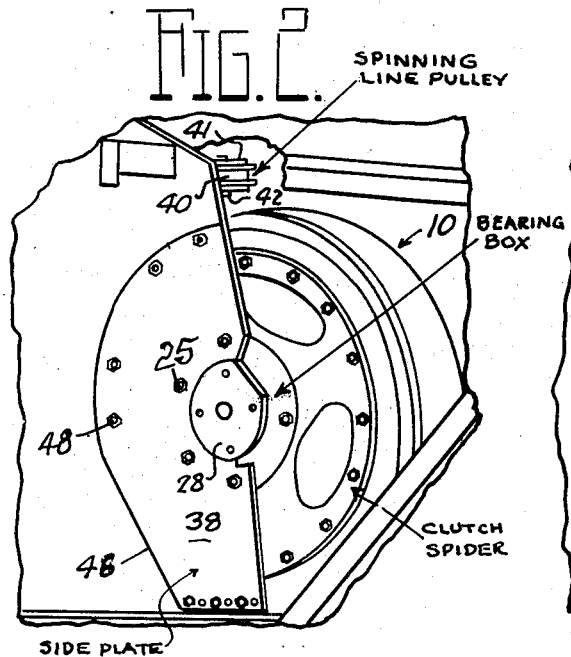
Fig. 2 is an enlarged fragmentary perspective front end view thereof, with the front guard removed.
Figure 3:
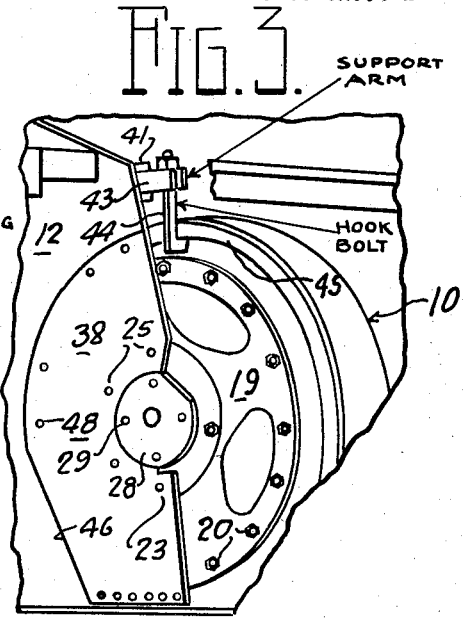
Fig. 3 is a similar view with the drum supported by auxiliary means.
Figures 4, 5:
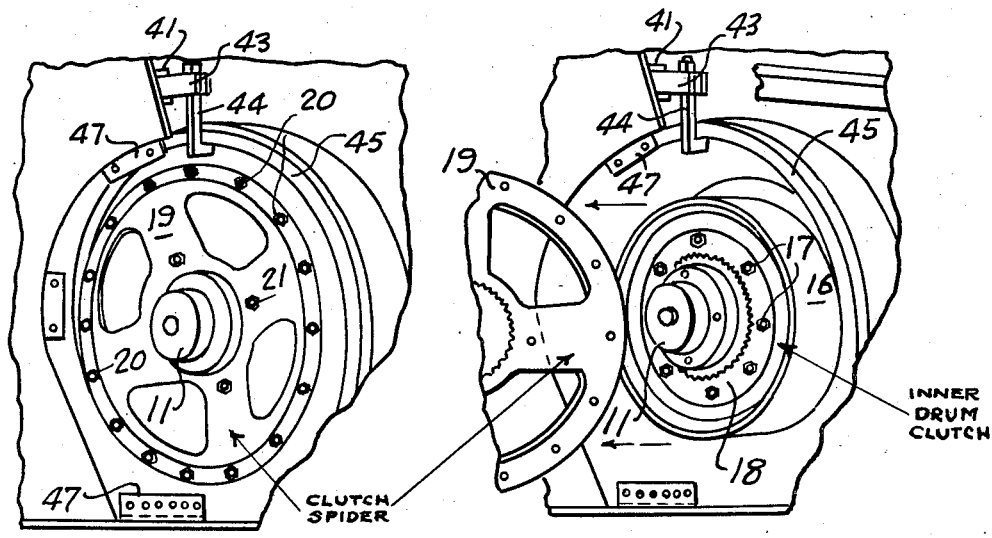
Fig. 4 is a similar view to Fig. 3, with the separable side and end plates removed.
Fig. 5 is a view similar to Fig. 4, with the outer clutch spider fragmentarily shown and removed from the assembly.

The removable side plate 38 is provided most conveniently by severing it as a unit from the housing side, as indicated by the line 46 in Figs. 2 and 3. This plate is thus flush with the remainder of the housing side 12 and bears against lip flanges 47 projecting from the inner side edge of the side wall. The plate is secured to these flanges by bolts 48 (Fig. 3). The bearing box receiving opening 23 is provided in the forward edge of the plate.

The removal of the side plate 38 permits easy access to the clutch parts for repair or removal which is permitted by reason of the adjacent end of the shaft being temporarily supported through the hoist drum by the suspending member 44. When the repair or replacement job has been completed, the side plate 38 is again mounted in the housing side wall, the bearing box 22 placed over the shaft end and the bearing set 26 and bolted to the side plate. The hanger bolt 44 is then loosened to permit the weight of the shaft 11 and parts carried thereby to be again supported by the bearing box 22 and side plate 38 from which the bearing box is, in turn, supported. In this manner repairs or replacement of parts on the shaft 11 may be easily and quickly accomplished without disturbing the shaft alignment or removing it laterally from its bearings.

I wish it understood that my invention is not limited to any specific construction, arrangement or form of the parts, as it is capable of numerous modifications and changes without departing from the spirit of the claims.

I claim:

1. In a hoist rig having a hoist drum, a mounting shaft therefor, control parts on one end portion of the shaft, a housing for the rig having a bearing in one housing side wall for the shaft end opposed to said control parts, the side wall of the housing adjacent to said control parts having an opening for receiving the shaft and substantially of a size to permit removal of said control parts therethrough without lateral shifting of the adjacent shaft end, a plate removably mounted in said opening and having an opening through which the adjacent shaft end projects, a bearing box for said last-mentioned shaft end forming a bearing support therefor and disposed in said plate opening, releasable means fixedly attaching said bearing box to said plate, and means forming an auxiliary support for the parts carrying end of the shaft for maintaining its normal axial alignment when said bearing box and side plate have been removed from said housing.

2. In a hoist rig having a hoist drum, a mounting shaft therefor, control parts on one end portion of the shaft, a housing for the rig having a bearing in one housing side wall for the shaft end opposed to said parts carrying end, the housing side wall opposed to said bearing end having an opening of a size substantially commensurate with the maximum dimension of said control parts to permit their removal therethrough when the shaft is in normal operating position and for receiving the adjacent shaft end, a side plate removably mounted in said opening, a bearing on said last shaft end, a bearing box for said bearing, means for rigidly attaching said bearing box to said side plate whereby the adjacent shaft end is indirectly supported by said side plate when said bearing box is attached thereto, and auxiliary means for engaging said drum to support the last-mentioned shaft end in normal operating position when said side plate and bearing box are removed from the housing side wall.

3. In a hoist rig having a protecting housing with opposing side walls, a shaft disposed in said housing with its ends journaled in and supported by said side walls, a hoist drum carried by said shaft intermediate said side walls, and control parts on one end portion of the shaft removable endwise therefrom, the improvement which comprises means for rendering removable a predetermined portion of the shaft supporting portion of one of said side walls to provide an opening in the side wall in register with and through which said control parts may be removed from the shaft when said portion has been removed from the side wall, means for releasably and fixedly attaching said removable portion to its side wall, and an auxiliary means for supporting the last-mentioned end of the shaft to maintain its normal operating position in the housing during removal of and while said removable side wall portion is removed.

4. A combination as called for in claim 3, wherein said hoisting rig has a frame part disposed over said drum, and a bracket projecting therefrom, and the auxiliary supporting means of said improvement includes a support arm removably carried by and projecting from said bracket, and a hook adjustably suspended from said arm and adapted to have suspending engagement with the top portion of the drum at the adjacent end edge thereof to support the adjacent shaft end and parts carried thereby independently of said removable side wall portion.

5. In a hoist rig having a protecting housing with opposed side walls, a drum shaft crosswise of said housing and having a bearing at one end in one of said side walls, a hoist drum on said shaft, and controllable drum clutch means on the shaft at the end of the drum oposed to said first bearing end and separably removable endwise from the shaft, the improvement which comprises bearing means for the clutch end of the shaft, said means forming a removable part of the adjacent housing side wall which part substantially corresponds in size to the maximum diameter of said clutch means, and means for supporting an end of said shaft adjacent said removable bearing means when said bearing means is removed whereby said clutch means may be removed from the shaft endwise thereof when said bearing means has been removed from the side wall and while the adjacent shaft end is being supported in normal position by said supporting means.

6. A hoist rig having a protecting housing with opposing side walls, a drum shaft mounted crosswise within said housing, bearing means for the shaft ends in the respective housing side walls, one at least of said bearing means being removable from its shaft and associated side wall, and a hoist drum on said shaft, the improvement comprising a bracket mounted within the housing above the top plane of said drum, and vertically adjustable means suspended from said bracket and engageable with an end of said drum which is adjacent to said removable bearing means whereby to support the drum and shaft at such end in normal position and in substitution for the associated bearing means.

7. In a hoist rig having a protecting housing with opposing side walls, a drum shaft mounted crosswise within said housing, bearing means for the shaft ends in the respective housing side walls, one at least of said bearing means being removable from the shaft and its associated side wall, a hoist drum on said shaft, and a spinning line pulley-holding bracket mounted within the housing above the top plane of said drum, the improvement comprising a supporting arm removably carried by and projecting from said bracket, and a hook member suspended from said arm for vertical adjustment relative thereto and engageable with an end portion of said drum which is adjacent to said removable bearing means whereby to support the drum and shaft at such end in normal position and in substitution for the associated bearing means.

References Cited in the file of this patent

UNITED STATES PATENTS

| | | |
|---|---|---|
| 2,181,359 | Barrett | Nov. 28, 1929 |
| 2,334,167 | Allin | Nov. 16, 1943 |
| 2,344,681 | Deschner | Mar. 21, 1944 |
| 2,540,099 | Christian | Feb. 6, 1951 |
| 2,667,331 | Robins et al. | Jan. 26, 1954 |
| 2,766,018 | Scheuerpflug | Oct. 9, 1956 |